Figure 2:
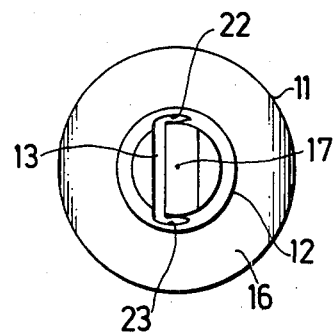

United States Patent [19]

Mez

[11] 3,919,826
[45] Nov. 18, 1975

[54] DEVICE FOR JOINING TWO SHEETS OF SHEET METAL

[76] Inventor: Georg Mez, Gartenstrasse 30A, 7416 Gonningen, Germany

[22] Filed: May 3, 1974

[21] Appl. No.: 466,907

Related U.S. Application Data

[63] Continuation of Ser. No. 314,465, Dec. 12, 1972, abandoned.

[52] U.S. Cl. ................................. 52/758 D; 85/37
[51] Int. Cl.² ........................................ F16B 17/00
[58] Field of Search .............................. 52/758 D; 85/37–39

[56] References Cited
UNITED STATES PATENTS

| | | | |
|---|---|---|---|
| 3,511,525 | 5/1970 | Friedling et al. | 52/758 D |
| 3,606,415 | 9/1971 | Friedling et al. | 85/37 |
| 3,710,435 | 1/1973 | Cordo | 52/758 D |

Primary Examiner—Frank L. Abbott
Assistant Examiner—Carl D. Friedman

[57] ABSTRACT

Two angularly disposed sheet metal sheets are joined by the device having a shank which passes through one sheet and has a longitudinal gap into which the other sheet is introduced. A connecting bore in the shank, larger than the gap, receives the sheet for permanently deforming the sheet against the wall of the bore.

10 Claims, 7 Drawing Figures

DEVICE FOR JOINING TWO SHEETS OF SHEET METAL

This is a continuation of application Ser. No. 314,465, filed Dec. 12, 1972, now abandoned.

The invention relates to a device for joining two sheets of sheet metal which are substantially perpendicular to each other, with the aid of a connecting link having a head and a shank, the shank traversing the sheet and the head at least indirectly abutting this sheet and the shank being connected with the other sheet.

When sheet metal is referred to hereinafter, then this is not in the sense of general engineering where even sheets of metal a few centimeters thick are described as sheet metal. Rather is a material understood by this term which material is so thin that it can be manually deformed with conventional tools. It will then have a thickness of a few millimeters at most. More particularly, such sheet metal as is conventionally used for ventilating and air conditioning engineering is meant.

In the sheet metal processing industry the problem sometimes arises of connecting a metal sheet to another metal sheet which is perpendicular to the first sheet. This may, for example, be the case when an air conducting duct is to be drawn into a guiding wall. Such guiding walls may have a straight course, but frequently their course is curvaceous. A perpendicularly bent over fold is then made on either side of the guiding wall and this fold is connected to the opposite wall. This connection may be made by welding, soldering, rivetting or with screws. Particularly when the wall is curved does it become difficult to make the fold since the latter does not participate in the curving. The fold either undulates or incisions must be made in it. sequent removal or some kind of correction by pressure. The fold also has the drawback that material may remain suspended on it which is conveyed with the air. In the textile processing industry, for example, fibres may become suspended on the fold.

It is also known to weld to the two longitudinal edges of the partition walls angles, brackets or the like. Here too the same difficulties arise in principle, since it is sometimes impossible to make contact with the flap or the fold which, after all, cannot be seen from outside. Furthermore, additional tools are required for this purpose.

Hitherto it has also been difficult to subsequently fit intermediate sheet metal sheets at the site since flanging machines or folding presses are not present on the site.

The problem of the invention is to devise a device by means of which sheets which are disposed at an angular relationship to each other can be firmly interconnected while managing with the most simple tools, and which nevertheless permits the sheet to be secured to be cut with clearance and to be buttingly secured.

According to the invention this problem is solved in that the shank has a longitudinal gap into which the other sheet can be introduced and in that a clearance larger than the longitudinal gap is provided in the terminal region thereof at the headward end of the gap, against the wall areas of which clearance the other sheet can be urged in a suitable region and permanently deformed.

Figure 4:
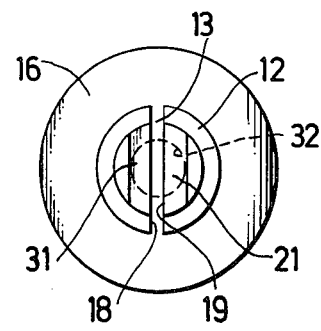
Figure 6:
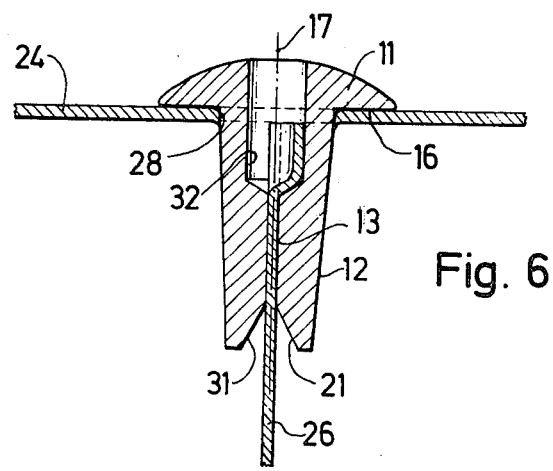
Figure 7:
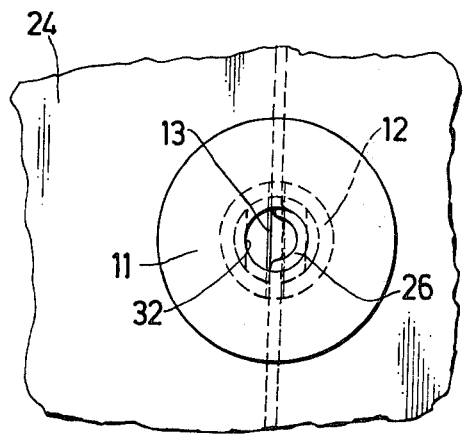

Other advantages and features of the invention are apparent from the description of preferred embodiments which follows. In the drawing FIG. 1 shows the side view of a first device,
FIG. 2 shows the view from underneath of FIG. 1,
FIG. 3 shows the side view of a second device,
FIG. 4 shows the view from underneath of FIG. 3,
FIG. 5 shows the device of FIG. 1 and 2 in use,
FIG. 6 shows the device of FIG. 3 and 4 in use,
FIG. 7 shows the view from above of FIG. 6.

The Figures are illustrated on a scale of 2 : 1, for sheet metal sheets of 1 mm. With regard to details of design reference is expressly made to the drawing.

Figure 1:
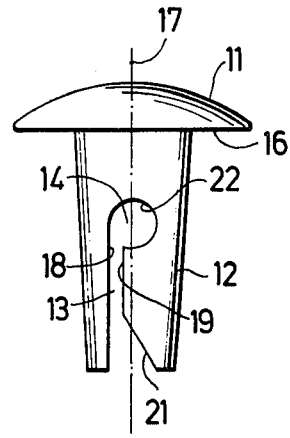
Figure 3:
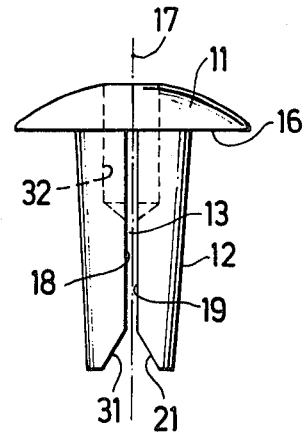

The device of FIG. 1 and 2 has a head 11, a shank 12, a gap 13 and a transverse bore 14. The head is mushroom-shaped and has a planar underside 16. It is rotation-symmetric to the geometrical longitudinal axis 17. The shank 12 is also symmetric to the geometrical longitudinal axis 17, and downwardly slightly conical. The gap 13 is offset toward the left relative to the longitudinal axis 17 while the central axis of the transverse bore 14 intersects the longitudinal axis 17. The gap 13 opens tangentially into the circular transverse bore 14 so that the lateral face 18 of the gap 13 gradually merges into the transverse bore 14. Slight offsetting of the lateral face 18 toward the right and the thus resulting shoulder would not do any harm. The righthand lateral face 19 merges into an introduction slope 21 which is very conical and extends to the lower end of the shank 12. The entire device is of metal which need by no means be hardened. Nevertheless, the edges 22, 23 of the transverse bore 14 act as cutting edges and retain their sharpness also when once or twice used.

Figure 5:
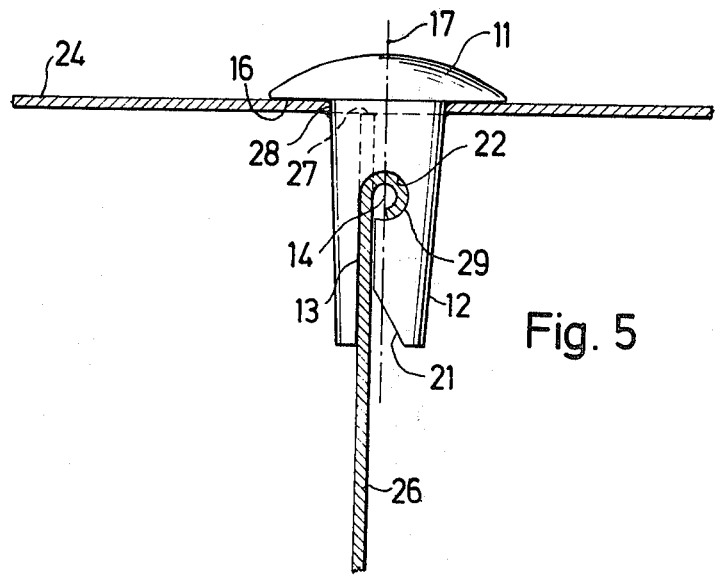

FIG. 5 shows the application of the device of FIG. 1 and 2. A first sheet 24 is to be seen and perpendicularly thereof a second sheet 26. The sheet 24 may be the outer wall of an air duct while the sheet 26 may be a partition wall. The leading edge 27 of the sheet 26 abuts the inner surface of the sheet 24 and passes across and under a circular bore 28 in the sheet 24. It can be seen that the sheet 26 is offset from the centre of the bore 28 by the same distance as is the gap 13 of the inserted device. The head 11 hermetically seals the bore 28 and directly contacts the sheet 24. But washers or interlayers may optionally be used. Because of its conicity the shank 12 readily finds the bore 28. Because of the introduction slope 21 the gap 13 also readily finds the sheet 26. The width of the gap 13 is 1.1 mm, while the thickness of the sheet 26 is 1 mm. Thus some play is available and the device is pushed onto the sheet 26 until the leading edge 27 abuts the transverse bore at about 10:00. Then the device cannot be pushed further toward the inside. The head 11 is then struck with a hammer and the edges 22, 23 cut a narrow strip out of the sheet 26, the width of which strip corresponds to the length of the transverse bore 14. The further the device is driven toward the interior, the more does the strip of sheet metal bend to form a coil 29. According to FIG. 5 it is in practice sufficient if the coil 29 extends as far as 6:00 approximately. If the coil is too short there is a risk of the device having axial play. If the coil 29 is too long, then there is a risk of it buckling because it impinges on the not coiled vertical portion of the sheet 26. The diameter of the bore 28 and the distance of the bore from the underside 16 must thus be coordinated with the purpose. When thinner sheets are used, then the radius of the transverse bore 14 may be smaller. When thicker sheets are used, then the radius should be larger. Moreover, in order to enable this coiling care must be taken when arranging the bore 14 that it is neither too close to nor too far apart from the underside 16. Excessive proximity means an incomplete coil and excessive distance means that the coil may buckle.

In the exemplary embodiment the gap 13 and the transverse bore 14 are so arranged that the resulting two halves of the shank 12 are weakened to about the same extent. When it is possible to use a thicker shank 12 or when the load capacity of the material can be disregarded, the the gap 13 and the transverse bore 14 may, of course, be offset farther toward the right so that the longitudinal axis 17 extends interiorly of the gap 13. Further, the lateral face 18 may also be permitted to merge into an introduction slope so that two introduction slopes are present. The transverse bore 14 need not be circular but it may alternatively be of a different, coil-forming, configuration. Also, the gap 13 may be shorter. The carrying length of the gap 13 should, however be such that it perfectly guides the sheet 26 and that the coil 29 is only subjected to axial loading. The gap 13 may also be curved or kinked if this is necessary for similarly shaped sheets 26. But then the cost of manufacturing will rise since the gap 13 can be obtained by simple sawing and the transverse bore 14 by simple drilling. It is best to first make the bore 28 and only then the gap 13.

Thus with this exemplary embodiment it is possible to form with a one-piece device according to the invention and with a hammer, in a simple manner, a connection which is virtually airtight, which permits simple processing of sheet metal, and where it is possible to observe through the bore 28 the location of the sheet 26. With this device it is even possible to bring the sheet 26 nearer and to place it in the correct position if it was not initially in such position.

In the second exemplary embodiment the shank 12 is of the same external shape but mirror symmetrically of the longitudinal axis 17 it has two introduction slopes 21, 31 which merge into the lateral faces 18, 19 of the gap 13. The latter is also symmetrically arranged and extends to the underside 16. The gap is 1 mm wide so that a 1 mm thick sheet, which in practice will generally have a small ridge, can be introduced with a few light blows on the head 11. From the direction of the head a bore 32 which is coaxial with the geometric longitudinal axis 17 and of circular configuration has been fashioned. This bore extends to almost half the length of the gap 13 and has a diameter which is five times the width of the gap 13. The illustrated shape represents an excellent compromise of expenditure on machining processing, strength and length as well as size of the guidance surfaces.

When using this device the sheet 26 is oriented as to its position, the sheet 26 is then received in the gap 13 and drawn through the introduction slopes 21, 31 as far as this is necessary, a few light blows with a hammer are then struck on the head 11 until the underside 16 is seated on the sheet 24. An appropriate area of the sheet 26 now extends across the bore 32 so that, although radial forces can be absorbed, axial forces cannot be absorbed. So as to be able to absorb also axial forces a punching means, a nail or other pin-like article is struck between the wall of the bore 32 and the sheet 26 located therein. The pin-like tool thereby urges a suitable area of the sheet 26 toward the right-hand side of the drawing when the blows have been struck at the left-hand side, and the sheet 26 is permanently deformed in this area. The material contacts half the periphery of the bore 28 in this area and axial forces can be satisfactorily absorbed. It is best for the leading portion of the pin-like article to be somewhat pointed. With regard to the symmetry of the arrangement it is immaterial whether the blows are struck at the right or at the left of the sheet 26. The blows also result in that the sheet 26 can be drawn toward the sheet 24 with a slight but adequate pretension. In order to release the connection it is merely necessary to drill with a drill into the bore 32 and to drill out the deformed area.

The bore 32 and the gap 13 need not necessarily be aligned. But then care must be taken from which side of the sheet 26 to strike the blows.

The invention does not only enable partition walls to be connected to outside walls. The invention can moreover be utilised wherever it is a matter of buttingly securing two sheet metal sheets to each other. When the gap 13 is cut to be suitably slanting or when the shank 12 is not perpendicular to the head 11, then it is also possible to depart from the right angle between the sheets and obtain connections at other angles.

In both exemplary embodiments the diameter of the bore 28 is advantageously equal in size to the diameter of the shank 12 at about half its length. The lower portion then serves for easy introduction and the upper portion flanges the rim of the bore 28 downwardly, as is indicated in the drawing. Not only will the seal between the shank 12 and the bore 28 be appreciably improved thereby, but the thus flanged rim will also wedgingly engage the face 27 of the sheet 26 so that the sheets 24, 26 will also thereby be mutually fixed. In the preferred second exemplary embodiment the conicity of the shank 12 in combination with the gap 13 leading to the very top have the task of compressing the shank 12 so that the gap 13 tends to become narrower. Therefore, not only are sheets which fit well into the gap 13 in their unclamped position satisfactorily retained. Rather is it possible to introduce into the gap 13 also thinner sheets which are then clamped fast by this clamping effect.

The distance of the transverse bore 14 from the underside 16 of the head may at least equal the radius of the transverse bore 14 plus the thickness of the other sheet 24.

The distance of the transverse bore 14 from the underside 16 of the head may be greater than the diameter of the transverse bore 14 plus the thickness of the first sheet 26, the magnitude of the distance being at most such as to permit maximum 180° coiling of the sheet strip situated in the transverse bore.

The longitudinal gap 13 may be radially displaced from the longitudinal axis 17 of the bore 32.

The ratio of the height of the head 11 to the length of the bore 32 to the length of the shank 12 is approximately 1:2.5:5±20%.

What is claimed is:

1. A sheet metal connection arrangement comprising two sheets of sheet metal positioned at an angle to each other, a connecting element comprising a shank passing through a first of said sheets, said connecting element having a longitudinal gap in the symmetrical axis thereof for receiving the other of said sheets whereby the leading edge of said other sheet contacts said first sheet and a head contacting said first of said sheets at least indirectly, said connecting element having a bore leading from said head into said longitudinal gap, of a diameter larger than the width of said gap, said other of said sheets having an area extending within said bore with its leading edge close to said first sheet, said extending area being offset along its entire extending height in a direction substantially normal to said bore towards that wall of said bore which is arranged beyond the symmetrical axis of said longitudinal gap, said area being position close to said wall and maintaining practically uninterrupted integration along its entire height with said other of said sheets.

2. A sheet metal connection according to claim 1 in which the end of said bore close to said longitudinal gap is conical-shaped.

3. A sheet metal connection according to claim 1 in which said longitudinal gap leads to the underside of said head and said shank is conical and tapers towards its free end.

4. A sheet metal connection according to claim 3 in which said first sheet has a bore through which said shank passes having a diameter which corresponds to the diameter of said conical shank at half the length of said shank.

5. A sheet metal connection according to claim 1 comprising somewhat outwardly diverging walls forming the longitudinal gap therebetween.

6. A sheet metal connection according to claim 1 in which said other sheet is curved and said longitudinal gap has a course which is curved corresponding to the curvature of said other sheet.

7. A sheet metal connection according to claim 1 in which said longitudinal gap is spaced to receive said other sheet with a slight play.

8. A sheet metal connection according to claim 1 in which said longitudinal gap is spaced for matching insertion of said other sheet therein.

9. A sheet metal connection according to claim 1 in which said longitudinal gap is spaced for receiving said other sheet with a press fit.

10. A sheet metal connection according to claim 1 in which the ratio of the height of said head to the length of said bore to the length of said shank is approximately 1:2.5:5± 20%.

* * * * *